(12) United States Patent
Braithwaite et al.

(10) Patent No.: US 9,409,772 B2
(45) Date of Patent: Aug. 9, 2016

(54) CARTRIDGE FOR CONTROLLED PRODUCTION OF HYDROGEN

(71) Applicant: Intelligent Energy Limited, Leicestershire (GB)

(72) Inventors: Daniel Braithwaite, San Francisco, CA (US); Wonhyoung Ryu, Goyang (KR); Courtney Aline Helland, San Francisco, CA (US); Kei E Yamamoto, San Francisco, CA (US); Andrew Philip Peterson, San Francisco, CA (US); Matthieu Jonemann, San Francisco, CA (US); Adam Naegeli Rodriguez, San Francisco, CA (US); Gabriel Jose Parisi-Amon, Pittsburgh, PA (US)

(73) Assignee: Intelligent Energy Limited, Loughborough (GB)

(*) Notice: Subject to any disclaimer, the term of this patent is extended or adjusted under 35 U.S.C. 154(b) by 305 days.

(21) Appl. No.: 14/259,048

(22) Filed: Apr. 22, 2014

(65) Prior Publication Data

US 2014/0227170 A1  Aug. 14, 2014

Related U.S. Application Data

(63) Continuation of application No. 12/803,965, filed on Jul. 9, 2010, now Pat. No. 8,741,004.

(51) Int. Cl.
*C01B 3/02* (2006.01)
*C01B 3/06* (2006.01)

(52) U.S. Cl.
CPC . *C01B 3/02* (2013.01); *C01B 3/065* (2013.01); *Y02E 60/362* (2013.01)

(58) Field of Classification Search
CPC .......... C01B 3/065; C01B 3/02; B01J 8/0235; B01J 8/0271
See application file for complete search history.

(56) References Cited

U.S. PATENT DOCUMENTS 3,262,801 A  7/1966  Lally et al.
3,774,589 A  11/1973  Kober
(Continued)

FOREIGN PATENT DOCUMENTS

DE  4221492 A1  1/1993
EP  1434292 A1  6/2004
(Continued)

OTHER PUBLICATIONS

DJ. Laser and J.G. Santiago, "A Review of Micropumps" J. Micromech. Microeng.; vol. 14 (2004) R35-R64.
(Continued)

*Primary Examiner* — Matthew Merkling
(74) *Attorney, Agent, or Firm* — Baker & Hostetler LLP (57) ABSTRACT

A reaction hydrogen production control mechanism is provided that includes, a solid sodium borohydride mixture, a liquid fuel reactant, at least one liquid delivery medium (LDM), a movable boundary interface (MBI) and a reaction zone, where the MBI is disposed to provide a constant contact between a reacting surface of the solid fuel mixture and the primary LDM to form the reaction zone. A reaction in the reaction zone includes a hydrolysis reaction. The MBI moves according to a spring, gas pressure, or an elastic membrane. Product paths are disposed to transfer reactants from the system. The product paths can include a channel on a surface of the solid fuel mixture, a channel disposed through the solid fuel mixture, a channel disposed about the solid fuel mixture, a contained region disposed about the solid fuel mixture, or a conduit abutting the solid fuel mixture.

20 Claims, 6 Drawing Sheets (56) References Cited

U.S. PATENT DOCUMENTS

| | | |
|---|---|---|
| 3,895,102 A | 7/1975 | Gallagher |
| 4,042,528 A | 8/1977 | Abe |
| 4,261,956 A | 4/1981 | Adlhart |
| 4,419,457 A | 12/1983 | Tokunaga |
| 4,846,176 A | 7/1989 | Golden |
| 5,182,046 A | 1/1993 | Patton et al. |
| 5,804,329 A | 9/1998 | Amendola |
| 5,817,157 A | 10/1998 | Checketts |
| 5,948,558 A | 9/1999 | Amendola |
| 6,106,801 A | 8/2000 | Bogdanovic et al. |
| 6,250,078 B1 | 6/2001 | Amendola |
| 6,326,097 B1 | 12/2001 | Hockaday |
| 6,375,638 B2 | 4/2002 | Nason et al. |
| 6,392,313 B1 | 5/2002 | Epstein et al. |
| 6,433,129 B1 | 8/2002 | Amendola et al. |
| 6,458,478 B1 | 10/2002 | Wang et al. |
| 6,461,752 B1 | 10/2002 | Leung |
| 6,468,694 B1 | 10/2002 | Amendola |
| 6,497,973 B1 | 12/2002 | Amendola |
| 6,524,542 B2 | 2/2003 | Amendola et al. |
| 6,534,033 B1 | 3/2003 | Amendola et al. |
| 6,534,950 B2 | 3/2003 | Leboe |
| 6,544,400 B2 | 4/2003 | Hockaday et al. |
| 6,544,679 B1 | 4/2003 | Petillo et al. |
| 6,579,068 B2 | 6/2003 | Bridger et al. |
| 6,586,563 B1 | 7/2003 | Ortega et al. |
| 6,645,651 B2 | 11/2003 | Hockaday et al. |
| 6,660,685 B1 | 12/2003 | Schussler et al. |
| 6,670,444 B2 | 12/2003 | Amendola et al. |
| 6,683,025 B2 | 1/2004 | Amendola et al. |
| 6,706,909 B1 | 3/2004 | Snover et al. |
| 6,713,201 B2 | 3/2004 | Bullock et al. |
| 6,723,072 B2 | 4/2004 | Flaherty et al. |
| 6,745,801 B1 | 6/2004 | Cohen et al. |
| 6,746,496 B1 | 6/2004 | Kravitz et al. |
| 6,808,833 B2 | 10/2004 | Johnson |
| 6,818,334 B2 | 11/2004 | Tsang |
| 6,821,499 B2 | 11/2004 | Jorgensen |
| 6,834,623 B2 | 12/2004 | Cheng |
| 6,834,632 B2 | 12/2004 | Kataoka et al. |
| 6,840,955 B2 | 1/2005 | Ein |
| 6,849,351 B2 | 2/2005 | Hartnack et al. |
| 6,887,596 B2 | 5/2005 | Leban |
| 6,893,755 B2 | 5/2005 | Leboe |
| 6,916,159 B2 | 7/2005 | Rush et al. |
| 6,924,054 B2 | 8/2005 | Prasad et al. |
| 6,932,847 B2 | 8/2005 | Amendola et al. |
| 6,939,529 B2 | 9/2005 | Strizki et al. |
| 7,019,105 B2 | 3/2006 | Amendola et al. |
| 7,083,657 B2 | 8/2006 | Mohring et al. |
| 7,105,033 B2 | 9/2006 | Strizki et al. |
| 7,105,245 B2 | 9/2006 | Ohlsen et al. |
| 7,108,777 B2 | 9/2006 | Xu et al. |
| 7,214,439 B2 | 5/2007 | Ortega et al. |
| 7,220,290 B2 | 5/2007 | Amendola et al. |
| 7,282,073 B2 | 10/2007 | Petillo et al. |
| 7,316,718 B2 | 1/2008 | Amendola et al. |
| 7,316,719 B2 | 1/2008 | Devos |
| 7,323,148 B2 | 1/2008 | Shah et al. |
| 7,393,369 B2 | 7/2008 | Shurtleff |
| 7,527,661 B2 | 5/2009 | Chellappa et al. |
| 7,530,931 B2 | 5/2009 | Amendola et al. |
| 7,540,892 B2 | 6/2009 | Strizki et al. |
| 7,579,806 B2 | 8/2009 | Okuto |
| 7,645,536 B2 | 1/2010 | Akiyama et al. |
| 7,662,435 B2 | 2/2010 | Chellappa et al. |
| 7,666,386 B2 | 2/2010 | Withers-Kirby et al. |
| 7,811,529 B2 | 10/2010 | Powell et al. |
| 7,867,300 B2 | 1/2011 | Chellappa et al. |
| 7,875,089 B2 | 1/2011 | Powell et al. |
| 7,922,781 B2 | 4/2011 | Chellappa et al. |
| 7,954,519 B2 | 6/2011 | Powell et al. |
| 8,100,993 B2 | 1/2012 | Fisher et al. |
| 8,118,893 B2 | 2/2012 | Rosenzweig et al. |
| 8,361,668 B2 | 1/2013 | McLean et al. |
| 2001/0045364 A1 | 11/2001 | Hockaday et al. |
| 2002/0114985 A1 | 8/2002 | Shkolnik et al. |
| 2002/0182459 A1 | 12/2002 | Hockaday et al. |
| 2003/0009942 A1 | 1/2003 | Amendola et al. |
| 2003/0022034 A1 | 1/2003 | Suzuki |
| 2003/0037487 A1 | 2/2003 | Amendola et al. |
| 2003/0049505 A1 | 3/2003 | Kameya et al. |
| 2003/0077494 A1 | 4/2003 | Aberle et al. |
| 2003/0082427 A1 | 5/2003 | Prasad et al. |
| 2003/0091879 A1 | 5/2003 | Rusta-Sellehy et al. |
| 2003/0138679 A1 | 7/2003 | Prased et al. |
| 2003/0198558 A1 | 10/2003 | Nason et al. |
| 2003/0235724 A1 | 12/2003 | Ord et al. |
| 2004/0011662 A1 | 1/2004 | Xu et al. |
| 2004/0013923 A1 | 1/2004 | Molter et al. |
| 2004/0048115 A1 | 3/2004 | Devos |
| 2004/0048132 A1 | 3/2004 | Takai et al. |
| 2004/0052704 A1 | 3/2004 | Devos |
| 2004/0062965 A1 | 4/2004 | Morse et al. |
| 2004/0062978 A1 | 4/2004 | Yazici |
| 2004/0096721 A1 | 5/2004 | Ohlsen et al. |
| 2004/0131903 A1 | 7/2004 | Shioya |
| 2004/0136156 A1 | 7/2004 | Nakamura et al. |
| 2004/0148857 A1 | 8/2004 | Strizki et al. |
| 2004/0197214 A1 | 10/2004 | Arthur et al. |
| 2004/0202548 A1 | 10/2004 | Dai et al. |
| 2004/0211054 A1 | 10/2004 | Morse et al. |
| 2004/0219409 A1 | 11/2004 | Isogai |
| 2004/0229101 A1 | 11/2004 | Davis |
| 2004/0253500 A1 | 12/2004 | Bourilkov et al. |
| 2005/0023236 A1 | 2/2005 | Adams et al. |
| 2005/0031931 A1 | 2/2005 | Kabumoto et al. |
| 2005/0036941 A1 | 2/2005 | Bae et al. |
| 2005/0037245 A1 | 2/2005 | Pham |
| 2005/0037252 A1 | 2/2005 | Pham |
| 2005/0058866 A1 | 3/2005 | Rocke et al. |
| 2005/0074641 A1 | 4/2005 | Inai et al. |
| 2005/0089415 A1 | 4/2005 | Cho et al. |
| 2005/0120621 A1 | 6/2005 | Lawson et al. |
| 2005/0158595 A1 | 7/2005 | Marsh et al. |
| 2005/0178061 A1 | 8/2005 | Tonca |
| 2005/0181250 A1 | 8/2005 | Beckmann et al. |
| 2005/0238573 A1 | 10/2005 | Zhang et al. |
| 2006/0059778 A1 | 3/2006 | Shurtleff et al. |
| 2006/0073365 A1 | 4/2006 | Kaye |
| 2006/0110639 A1 | 5/2006 | Walter |
| 2006/0127734 A1 | 6/2006 | McLean et al. |
| 2006/0172694 A1 | 8/2006 | Gau et al. |
| 2006/0194082 A1 | 8/2006 | Tucker et al. |
| 2006/0196112 A1 | 9/2006 | Berry et al. |
| 2006/0275645 A1 | 12/2006 | Gallagher et al. |
| 2007/0002172 A1 | 1/2007 | Calvignac et al. |
| 2007/0020171 A1 | 1/2007 | Waki et al. |
| 2007/0020172 A1 | 1/2007 | Withers-Kirby et al. |
| 2007/0031711 A1 | 2/2007 | Miyata et al. |
| 2007/0036711 A1 | 2/2007 | Fisher et al. |
| 2007/0037034 A1 | 2/2007 | Fisher et al. |
| 2007/0042244 A1 | 2/2007 | Spallone |
| 2007/0068071 A1 | 3/2007 | Kelly et al. |
| 2007/0108056 A1 | 5/2007 | Nyberg et al. |
| 2007/0120872 A1 | 5/2007 | Satoh |
| 2007/0122668 A1 | 5/2007 | Suzuki et al. |
| 2007/0166595 A1 | 7/2007 | Akiyama et al. |
| 2007/0189960 A1 | 8/2007 | Yamamoto |
| 2007/0264546 A1 | 11/2007 | Laven |
| 2008/0025880 A1 | 1/2008 | Shurtleff et al. |
| 2008/0044691 A1 | 2/2008 | Wake et al. |
| 2008/0172932 A1 | 7/2008 | Kelly et al. |
| 2008/0187798 A1 | 8/2008 | McLean et al. |
| 2008/0203816 A1 | 8/2008 | Fujita |
| 2008/0220297 A1 | 9/2008 | Sarata et al. |
| 2008/0292541 A1 | 11/2008 | Kamada et al. |
| 2009/0092864 A1 | 4/2009 | McLean et al. |
| 2009/0117420 A1 | 5/2009 | Nakakubo |
| 2009/0197125 A1 | 8/2009 | Salvador et al. |
| 2009/0269634 A1 | 10/2009 | Fabian et al. |
| 2009/0274595 A1 | 11/2009 | Fisher et al. |
| 2009/0304558 A1 | 12/2009 | Patton et al. |
| 2010/0150824 A1 | 6/2010 | Withers-Kirby et al. |

(56) References Cited

U.S. PATENT DOCUMENTS

| | | |
|---|---|---|
| 2010/0173214 A1 | 7/2010 | Fabian et al. |
| 2010/0323254 A1 | 12/2010 | Mori et al. |
| 2011/0020215 A1 | 1/2011 | Ryu et al. |
| 2011/0053016 A1 | 3/2011 | Braithwaite et al. |
| 2011/0070151 A1 | 3/2011 | Braithwaite et al. |
| 2011/0159386 A1 | 6/2011 | Kaupert et al. |
| 2011/0200495 A1 | 8/2011 | Braithwaite et al. |
| 2011/0311895 A1 | 12/2011 | Spare et al. |
| 2011/0313589 A1 | 12/2011 | Iyer et al. |
| 2012/0100443 A1 | 4/2012 | Braithwaite et al. |

FOREIGN PATENT DOCUMENTS

| | | |
|---|---|---|
| JP | 2002-234358 A | 8/2002 |
| JP | 2006-079891 A | 3/2006 |
| JP | 2007-157587 A | 6/2007 |
| WO | WO 00/12889 A1 | 3/2000 |
| WO | WO 04/001235 A1 | 12/2003 |
| WO | WO 2005/049485 A1 | 6/2005 |
| WO | WO 2005/057703 A1 | 6/2005 |
| WO | WO 2005/123586 A2 | 12/2005 |
| WO | WO 2006/093735 A2 | 9/2006 |
| WO | WO 2007/021924 A2 | 2/2007 |
| WO | WO 2007/021934 A2 | 2/2007 |
| WO | WO 2007/035845 A2 | 3/2007 |
| WO | WO 2007/055146 A1 | 5/2007 |
| WO | WO 2007/109036 A2 | 9/2007 |
| WO | WO 2007/120872 A2 | 10/2007 |
| WO | WO 2011/011050 A2 | 1/2011 |
| WO | WO 2011/028242 A2 | 3/2011 |
| WO | WO 2012/054787 A1 | 4/2012 |
| WO | WO 2012/058688 A1 | 5/2012 |

OTHER PUBLICATIONS

Ying, Wu, "Hydrogen Storage via Sodium Borohydride: Current Status, Barriers & R&D Roadmap" Presentation presented at GCEP, Stanford University, Apr. 14-15, 2003.

Definition of course work technical terms. Southwest Tech, 2002-2006. [Retrieved on Feb. 8, 2012]. Retrieved from the Internet <URL: http://www.swtc.edu/Ag.sub.--Power/hydraulics/terms.htm.

Schlesinger et al, "Sodium Borohydride, Its Hydrolysis and its Use as a Reducing Agent and in the Generation of Hydrogen," J. Am. Chem. Soc.; vol. 75 (Mar. 15, 1952), pp. 215-219.

Laser et al., "A Review of Micropumps," J. Micromech. Microeng.; vol. 14 (2004) R35-R64.

Wu, "Hydrogen Storage via Sodium Borohydride: Current Status, Barriers & R&D Roadmap," Presentation presented at GCEP, Stanford University, Apr. 14-15, 2003.

Written Opinion of the International Searching Authority for PCT/US2010/02022.

Amendola, S.C., A safe, portable, hydrogen gas generator using aqueous borohydride solution and Ru catalyst, 2000, Int'l journal of Hydrogen Energy, vol. 25, pp. 969-975.

FIG. 8

CARTRIDGE FOR CONTROLLED PRODUCTION OF HYDROGEN

This application is a continuation of U.S. patent application Ser. No. 12/803,965, filed Jul. 9, 2010, which is hereby expressly incorporated by reference as if fully set forth herein, in its entirety.

FIELD OF THE INVENTION

The invention relates to hydrogen production. In particular, the invention relates to managing the production of hydrogen from a sodium borohydride reaction.

BACKGROUND OF THE INVENTION

Hydrogen gas can be produced from a sodium borohydride (SBH) reaction, which provides a compact, high-density, controllable source of hydrogen gas. When reacted with water, in the presence of a suitable catalyst, the hydrogen complexes can provide a sizeable hydrogen gas yield by weight.

When SBH is combined with water, an exothermic reaction occurs that does not require the addition of heat or high pressure.

Adding water to SBH results in a crust layer on the surface due to production of the reactant product. As the crust layer grows, the water is less able to penetrate it to react with the unreacted SBH, restricting or even stopping the hydrogen production.

What is needed is a hydrogen production system that provides hydrogen gas where the reactant product is propagated away from the reaction zone according to forces provided by the produced hydrogen gas.

SUMMARY OF THE INVENTION

To overcome the shortcomings in the prior art, the current invention provides a reaction control mechanism that includes, a solid fuel mixture, a liquid fuel reactant, a primary liquid delivery medium (LDM), a movable boundary interface (MBI) and a reaction zone, where the MBI is disposed to provide a constant contact between a reacting surface of the solid fuel mixture and the primary LDM to form the reaction zone.

In one aspect of the invention, the reaction zone includes a reaction product path disposed to remove reaction products from the reaction zone. In another aspect, the reaction product path can include at least one channel disposed on a surface of the solid fuel mixture, at least one channel disposed through the solid fuel mixture, at least one helix channel disposed about the solid fuel mixture, a contained region disposed about the solid fuel mixture, or at least one conduit abutting the solid fuel mixture. Further, the reaction product path can include guides disposed in the reaction product path, where the guides are disposed to provide the liquid fuel reactant to the reaction zone, where a secondary LDM is disposed to provide the liquid fuel reactant independently from the primary LDM.

In another aspect of the invention a reaction in the reaction zone includes a hydrolysis reaction.

In a further aspect of the invention, the solid fuel mixture includes at least solid sodium borohydride (SBH).

According to another aspect of the invention, the MBI moves according to a physical moving element providing a force, where the force can be from a spring, gas pressure, or an elastic membrane. In one aspect, the elastic membrane envelops the solid fuel mixture.

In yet another aspect of the invention, the primary LDM is a stationary LDM.

In a further aspect, the primary LDM receives a compression force from the MBI.

According to one aspect of the invention, the primary LDM provides liquid to a reaction product path disposed between a surface of the solid fuel mixture and the MBI, wherein the reaction product path is disposed to transfer reactants to the reaction zone of the MBI and transfer products from the reaction zone of the MBI. In one aspect, the reaction product path can include at least one channel disposed on a surface of the solid fuel mixture, at least one channel disposed through the solid fuel mixture, at least one helix channel disposed about the solid fuel mixture, a contained region disposed about the solid fuel mixture, or at least one conduit abutting the solid fuel mixture. In another aspect, the MBI is an elastic membrane disposed to envelope the solid fuel mixture, where when the reactants are present in the reaction product path the elastic membrane is disposed to apply a pressure on the reactants to propagate the reactant along the reaction product path. In a further aspect, the elastic membrane pressure applied to the reactant is a variable pressure.

According to another aspect of the invention, a rate of the reaction is controlled by a rate of liquid provided by the primary LDM.

In a further aspect of the invention, a reaction product exiting the reaction zone includes a combination of a partially reacted liquid fuel reactant and the solid fuel mixture.

According to one aspect of the invention, the reaction control mechanism further includes a secondary LDM, where the secondary LDM is disposed in a reaction product path to control an overall reaction stoichiometry. The reaction stoichiometry can include a ratio of produced hydrogen to liquid fuel flow. Further, the secondary LDM is located in a reaction product path exiting the reaction zone.

DETAILED DESCRIPTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
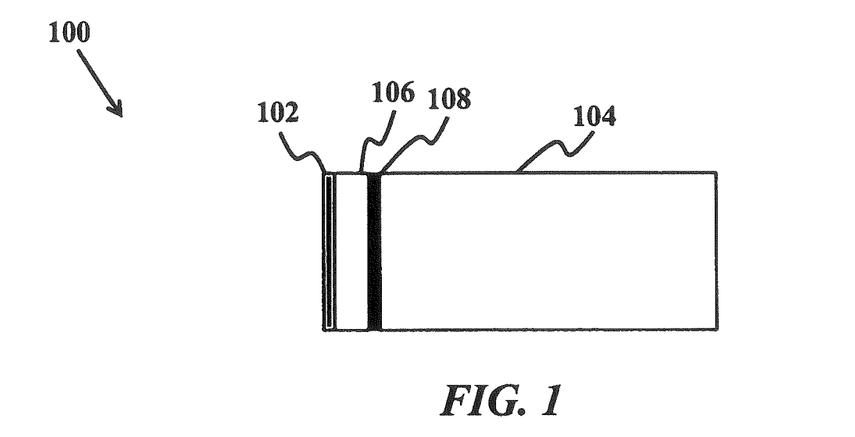
FIG. 1 shows a schematic drawing of a hydrogen generation system that includes a moveable barrier interface, according to the current invention.

According to the current invention, as shown in FIG. 1, a hydrogen generation system 100 includes a moving boundary interface (MBI) 102 that ensures a constant contact between a solid fuel 104 and a liquid delivery medium (LDM) 106, where the region of constant contact between the solid fuel 104 and the liquid LDM 106 is a reaction zone 108. The MBI 102 can either physically bring the reacting surface of a solid fuel 104 in contact with a stationary LDM 106, or bring an LDM 106 in contact with the varying contour of the reacting surface of a solid fuel 104. Movement of the MBI 102 can be accomplished by using an applied force that can include a spring force, gas (preferably $H_2$) pressure, or elastic membrane.

Figure 2:
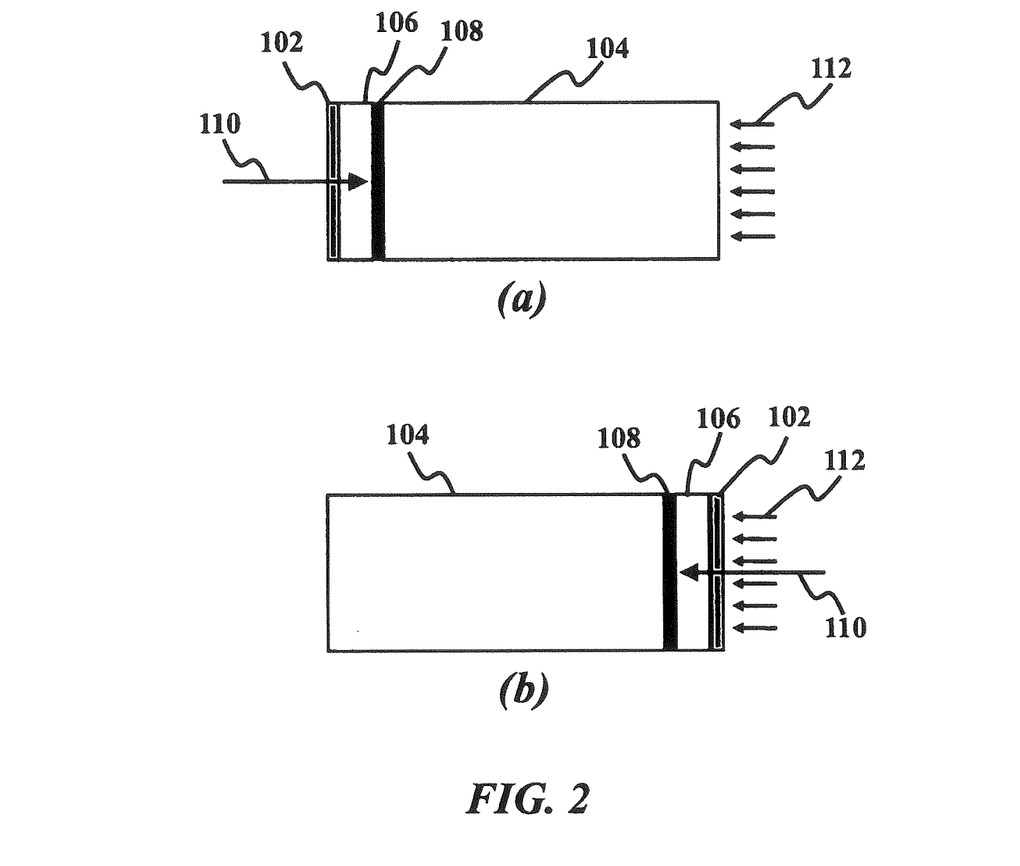
FIGS. 2a-2b show schematic drawings hydrogen generation systems having a moving boundary interface with forces applied, according to the current invention.

Hydrogen generation systems 100 having the MBI 102, according to one aspect of the current invention, use compression force on a side of a solid fuel mixture 104. A compression force can be applied either to the side close to reaction zone 108 or the opposite side of the fuel mixture 104 using spring force, gas pressure or elastic membrane force, and the rate of the reaction is controlled by a rate of liquid provided by the primary LDM 106. FIGS. 2a-2b show examples of a hydrogen generation system 100 that utilizes compression forces in order to maintain a constant contact between LDM 106, providing liquid fuel reactant, 110 and the unreacted surface of the solid fuel 104, where the solid fuel 104 can be a sodium borohydride (SBH) fuel mixture. FIG. 2a shows one embodiment of the invention, where a compression force 112 is applied to the end of the system 100 that is opposite of the LDM 106, Alternatively, FIG. 2b shows compression force 112 is applied to the end of the system 100 of the LDM 106. At the reaction zone 108, hydrolysis occurs and reactant products are generated. According to the current invention, the constant compression between the LDM 106 and the surface of the solid fuel mixture 104 pushes the reactant product away from the reaction zone 108 and maintains continuous contact or the LDM 106 and the unreacted portion of the fuel mixture 104.

Figure 3:
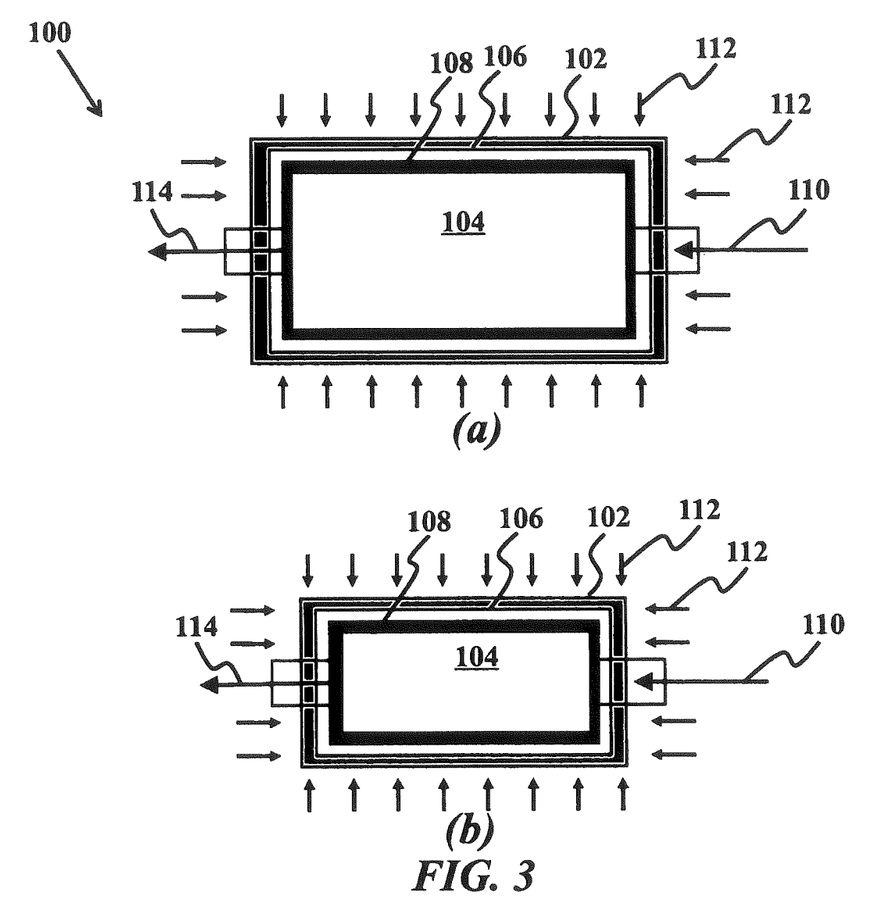
FIGS. 3a-3b show schematic drawings of hydrogen generation systems that include an elastic membrane moveable barrier interface enveloping the solid fuel mixture, according to the current invention.

Other embodiments of the current invention use an elastic membrane to apply compression force around a solid fuel mixture 104. When a fuel mixture 104 is consumed and decreases in its volume, the elastic membrane MBI 102 shrinks and maintains its continuous contact to the surface of a fuel mixture 104. FIGS. 3a-3b show the embodiment of the invention that includes an elastic membrane MBI 102 that envelops the solid fuel mixture 104 and LDM 106 to maintain contact between the two elements. According the current embodiment, prior to SBH hydrolysis, the elastic membrane MBI 102 tightly encloses the solid fuel mixture 104. An LDM 106 is disposed between the surface of the fuel mixture 104 and the elastic MBI 102 to provide liquid reactant for forming a reaction zone 108, where when a liquid reactant from the LDM 106 is pumped into the system 100, the reaction occurs at the reaction zone 108. As the reaction progresses further, the volume of the fuel mixture 104 decreases, as show in FIG. 3b since the reactant products 114 are continuously pushed away from the reaction zone 108. The elastic membrane 102 shrinks over this varying contour of the fuel mixture 104, providing a continuous contact between the surface of the fuel mixture 104 and the LDM 106. A desired material to form an elastic MBI 102 conforms to the surface of a shrinking fuel mixture 104. Exemplary elastic MBI 102 materials can include, any elastic or rubbery materials (such as latex, silicone, viton, polyurethane, neoprene, buna-N, PTFE, ePTFE, perfluoroelastomer, fluorosilicone, Atlas, or Hytrel . . . etc), elastic fabrics, heat shrinkable fabrics, or spring sheets.

Figure 4:
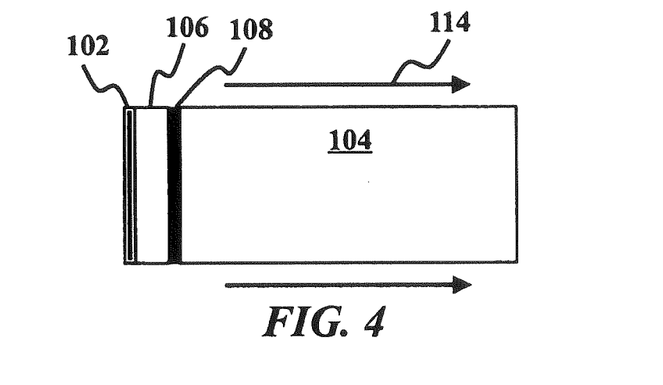
FIG. 4 shows the SBH hydrolysis reaction at one side of a cylindrical fuel with the reaction products guided externally around the fuel body, according to the current invention.

When a non-liquid fuel is employed and the hydrolysis reaction is induced at any surface of the solid fuel 104, the hydrolysis products need to be continuously removed from a reaction zone 108 to ensure a clean contact between an LDM 106 and the unreacted surface of the solid fuel 104. Providing clear and fabricated pathways for product removal 114 prevents any unexpected failure such as uncontrolled pressure buildup due to the product clogging, the entry disruption of liquid reactants, or the uncontrolled form-factor dismantling of a solid fuel 104. According to another aspect of the current invention, pathways for product removal 114 are provided. Hydrolysis products can be removed from a reaction zone 108 in multiple ways, where some exemplary embodiments are provided herein. For example, FIG. 4 shows when SBH hydrolysis reaction occurs at one side of a cylindrical fuel 104, its resulting products can be guided externally 114 around the fuel body 104.

Figure 5:
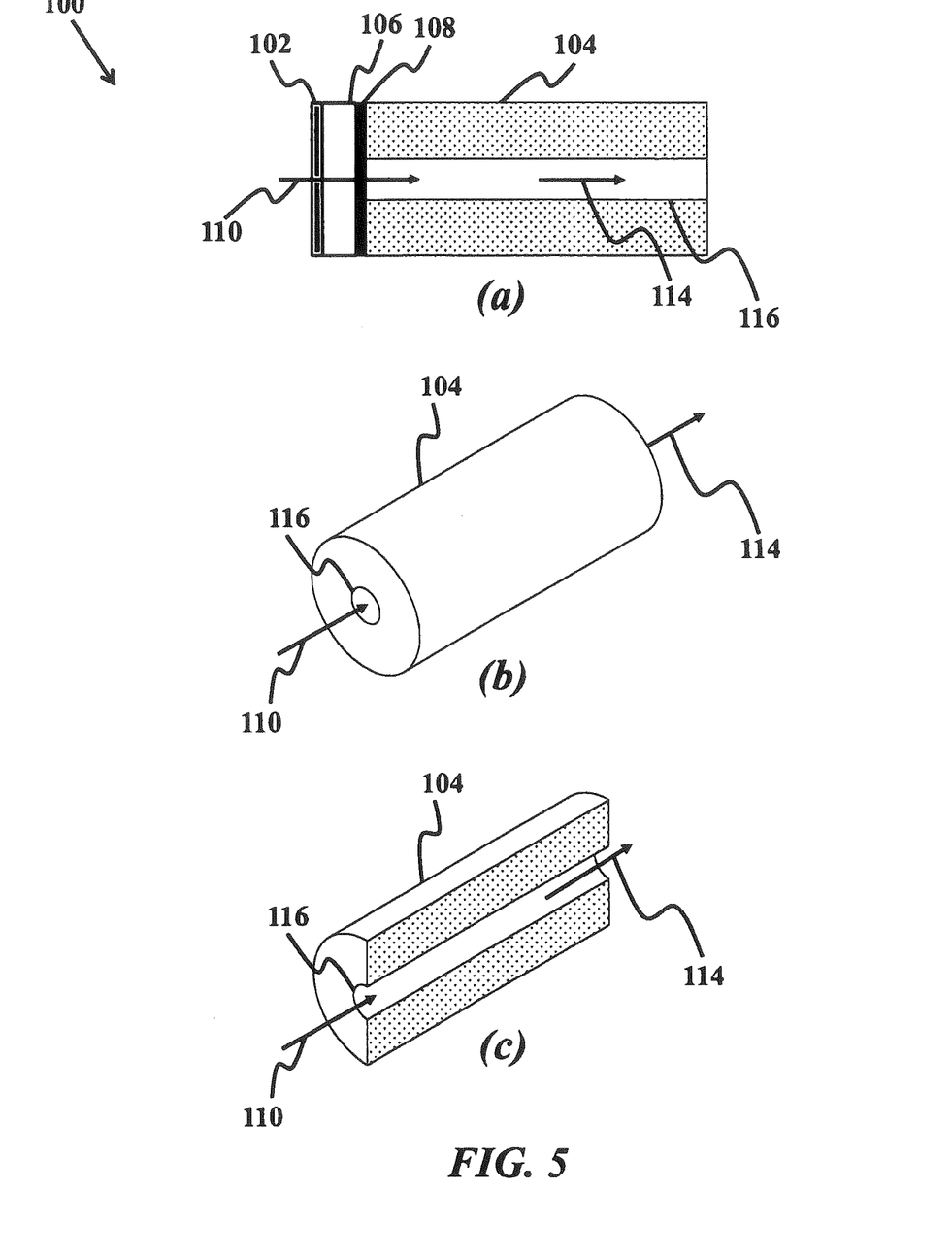
FIGS. 5a-5c show the hydrogen generation systems having the MBI and a fuel mixture with a through internal conduit, according to the current invention.

FIGS. 5a-5c show a hydrogen generation system 100 having the MBI 102 and a fuel mixture 104 with a through internal conduit 116. As liquid reactant 110 is provided to the hydrogen generation system 100 through the LDM 106, the MBI 102 has an applied force, as described above, applied to the MBI 102, the reaction zone 108 produces the hydrogen gas and reactant products 114. The embodiment of FIGS. 5a-5c shows an internal conduit 116 for moving the reactant products 114 out of the solid fuel 104, where the reaction zone 108 is kept at an optimum for providing hydrogen gas.

Figure 6:
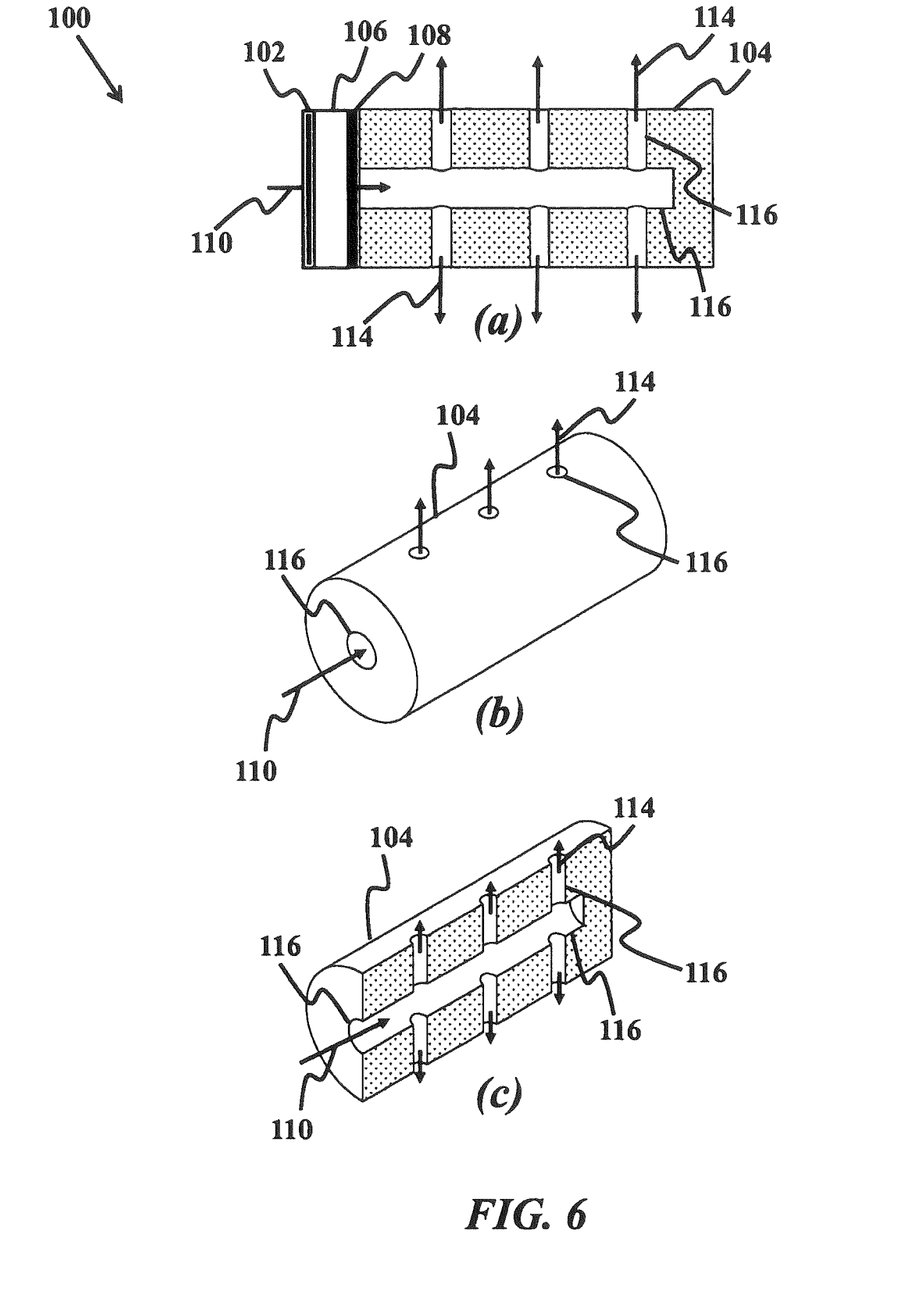
FIGS. 6a-6c show exemplary forms of the internal conduits and outside through holes in a radial direction, according to the current invention.

According to the current invention, the internal conduits 116 are provided in many forms. Some exemplary forms include internal conduits connected to outside through holes in a radial direction, as shown in FIGS. 6a-6c, where the LDM 106, provides liquid reactant 110, and the MBI 102 is forced against the solid fuel 104 to promote a reaction zone 108. The reaction in hydrogen generation system 100 outputs hydrogen gas and reactant products 114, where the reactant products 114 are forced out of solid fuel 104 through the internal conduits 116 that can include the through and radial internal conduits 116. FIGS. 6b and 6c show the solid fuel element 104 with the internal conduits 116, where liquid reactant 110 is provide to the reaction zone 108 (not shown for illustrative purposes) and the reactant products 114 exit through the radial internal conduits 116, according to one aspect of the current invention.

Figure 7:
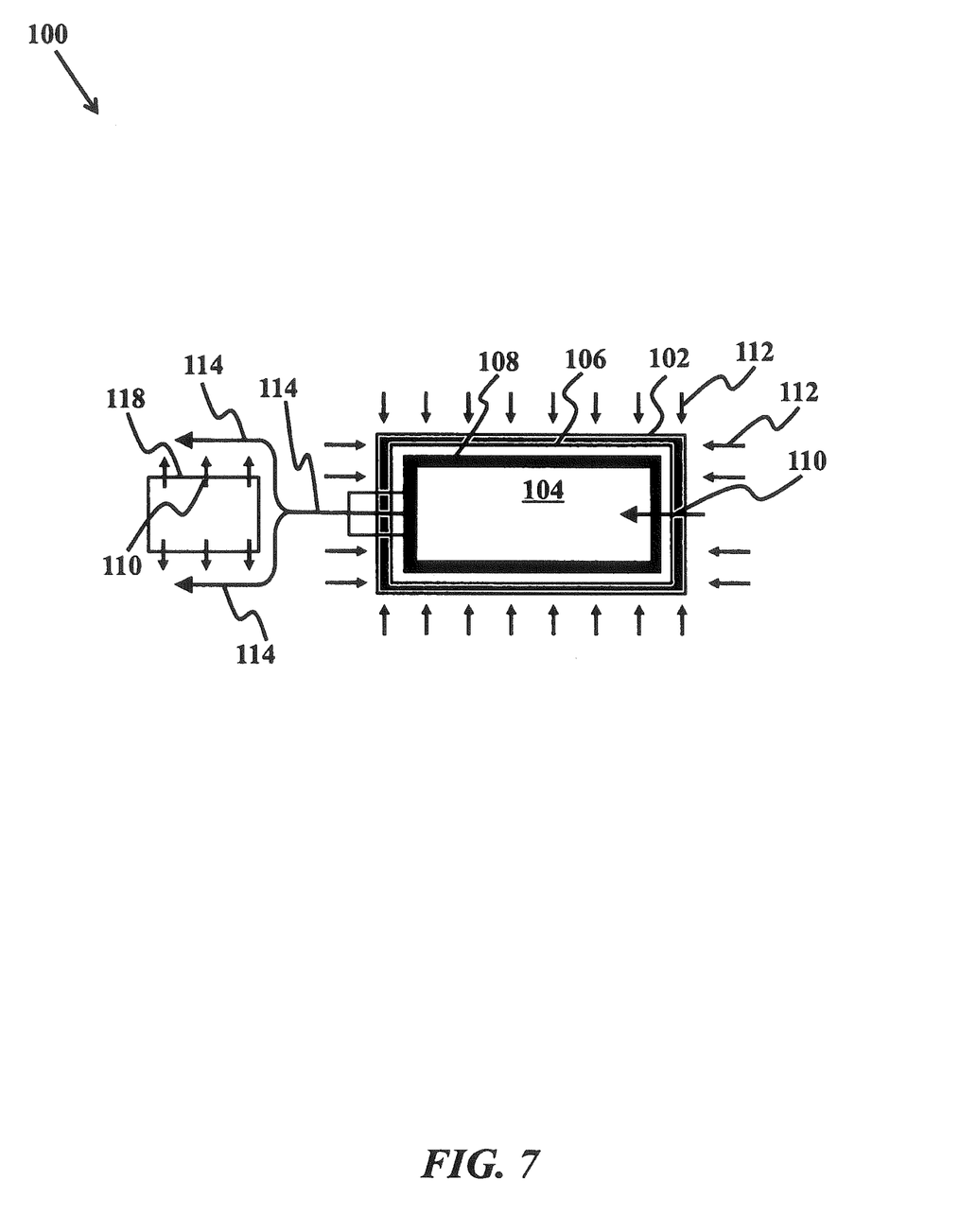
FIG. 7 shows an exemplary embodiment of the invention.

In another embodiment of the invention a secondary LDM is added to the system 100. According to the invention, the effective reaction zone 108 may change with increasing utilization of the solid fuel mixture 104. As the solid fuel mixture 104 is consumed, the length of the reaction product guide (see FIGS. 8a-8c), and in some embodiments also the area of the reaction zone 108, decreases due to shrinking volume of the unreacted solid fuel mixture 104. This leads to variations in reaction stoichiometry (amount of hydrogen flow per liquid fuel flow). For optimum hydrogen fuel utilization and product separation it is beneficial to adjust the overall reaction stoichiometry by implementing a secondary LDM 118, as shown in FIG. 7. Here, FIG. 7 shows the embodiment of the invention that includes an elastic membrane MBI 102 that envelops the solid fuel mixture 104. A primary LDM 106 is disposed between the surface of the fuel mixture 104 and the elastic MBI 102 to provide liquid reactant 110 for forming a reaction zone 108, where when a liquid reactant 110 from the primary LDM 106 is pumped into the system 100, the reaction occurs at the reaction zone 108. As the reaction progresses further, the volume of the fuel mixture 104 decreases, as shown in FIG. 3b, since the reactant products 114 are continuously pushed away from the reaction zone 108. The elastic membrane 102 shrinks over this varying contour of the fuel mixture 104, providing a continuous contact between the surface of the fuel mixture 104 and the primary LDM 106. The reactant products 114 exit the elastic membrane 102 and pass by the secondary LDM 118, where additional liquid fuel 110 is added to the reactant products 114.

Figure 8:
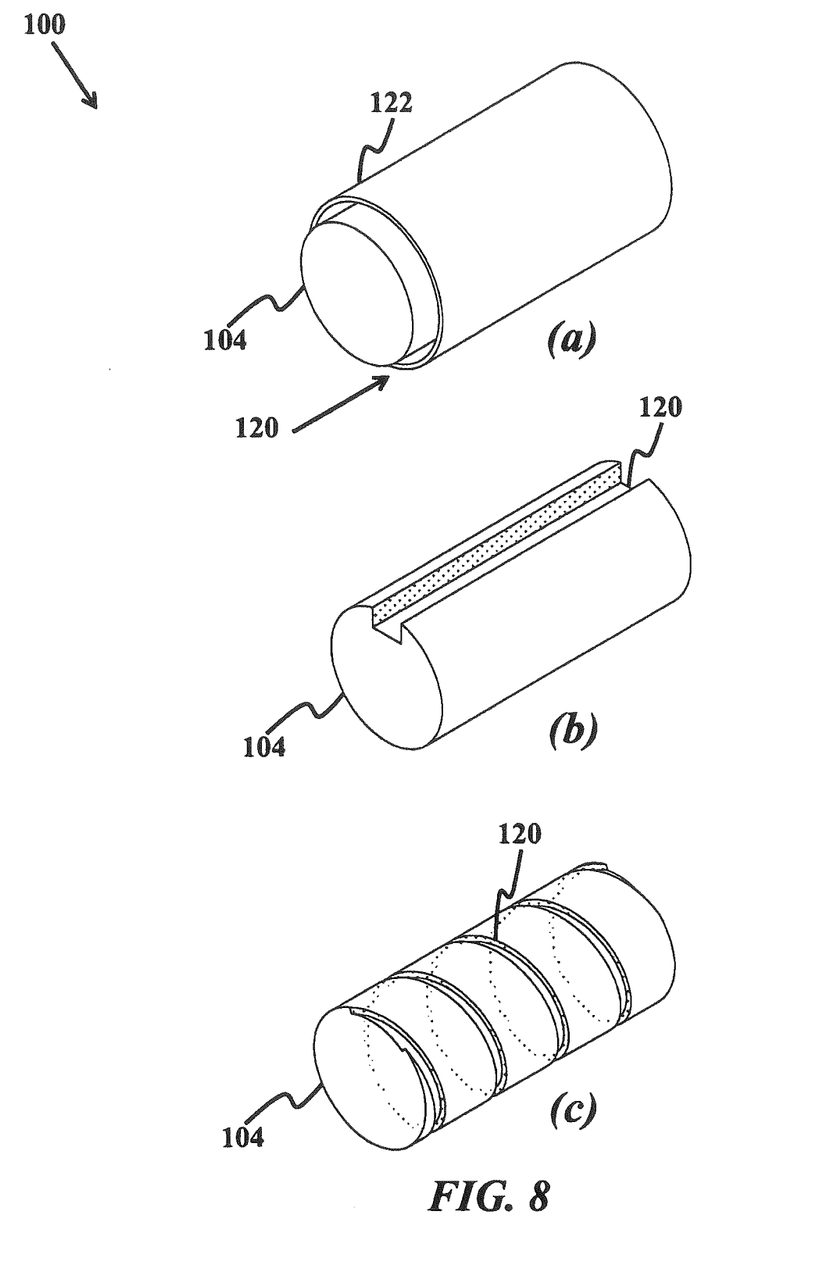
FIGS. 8a-8c show exemplary embodiments of dimensions and patterns of the product guide, according to the current invention.

FIGS. 8a-8c show exemplary embodiments of dimensions and patterns of the product guide 120 that can be for different operation conditions of each fuel system 100. FIG. 8a show an example of a product guide 120 structured outside the surface of the solid fuel 104, where the gap between the fuel surface 104 and enclosure 122 act as the product guide 120. According to another aspect of the invention, hydrolysis occurs either on a radial or longitudinal side of the cylindrical fuel 104, where the concurrently-generated products flow through the concentric gap 120 and exit the fuel zone. FIG. 8b shows a straight-channel product guide 120 structured in the compacted body of a fuel mixture 104. Dimensions and geometries of this channel can determine the flow kinetics of products and allow fine-tuning of product 114 disposal. FIG. 8c shows a spiral-channel product guide 120 structured on the body of a fuel mixture 104 in order to mitigate orientation-dependency in the product 114 disposal.

Orientation-dependent consumption at a certain location of a fuel, in particular of solid type SBH fuels, often causes the uncontrolled dismantling of the fuel form factor, resulting in orientation-dependent hydrogen generation even at a constant pumping rate of a liquid reactant. This typically occurs when there is a slight surplus of a liquid reactant or the reactant is not contained properly at the desired reaction zone of a system. The surplus of leaking reactant is typically pooled at the bottom of the fuel by gravity. This pooled reactant starts unwanted SBH hydrolysis at a location away from the reaction zone, resulting in the uncontrolled fuel consumption. The current invention operates without orientation-dependent consumption, for example the combined embodiment shown in FIGS. 4a-4b and FIG. 8c.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

The invention claimed is:

1. A method of producing hydrogen gas comprising:
   (a) delivering a primary liquid delivery medium (LDM) comprising a liquid fuel reactant to contact a solid fuel mixture in a reaction zone under conditions sufficient to cause a reaction between the liquid fuel reactant and the solid fuel mixture;
   the delivery of the primary liquid delivery medium being controlled by a movable boundary interface (MBI) that biases the primary liquid delivery medium against the solid fuel mixture;
   the reaction zone comprising a reaction product path, said reaction product path being disposed to remove reaction products from said reaction zone during the course of the reaction; and,
   (b) independently contacting the reaction products with a second liquid delivery medium outside of the reaction zone.

2. The method of claim 1, said method being conducted in a reaction control mechanism comprising:
   a. the solid fuel mixture;
   b. the liquid fuel reactant;
   c. the primary liquid delivery medium (LDM) fluidly connected to and configured to deliver the liquid fuel reactant to the solid fuel mixture;
   d. the movable boundary interface (MBI) coupled to a primary liquid delivery medium distal the solid fuel mixture that biases the primary liquid delivery medium against the solid fuel mixture;
   e. the reaction zone defined between the solid fuel mixture and the primary liquid delivery mechanism; and,
   f. the second liquid delivery medium located in a reaction product path exiting the reaction zone.

3. The method of claim 1, wherein the reaction product path is comprises at least one channel defined in a surface of said solid fuel mixture, at least one channel disposed through said solid fuel mixture, at least one helix channel disposed about said solid fuel mixture, at least one conduit abutting said solid fuel mixture, or a combination thereof.

4. The method of claim 1, wherein the reaction product path comprises guides disposed in said reaction product path, wherein said guides are disposed to provide said liquid fuel reactant to said reaction zone, wherein the secondary LDM is disposed to provide said liquid fuel reactant independently from said primary LDM.

5. The method of claim 1, wherein the solid fuel mixture and the liquid fuel reactant react through a hydrolysis reaction.

6. The method of claim 1, wherein the solid fuel mixture comprises at least solid sodium borohydride (SBH).

7. The method of claim 1, wherein the MBI moves according to a physical moving element providing a force by an elastic membrane.

8. The method of claim 7, wherein the elastic membrane envelopes said solid fuel mixture.

9. The method of claim 7, wherein the elastic membrane comprises an elastic polymer of fabric, a heat shrinkable fabric, a spring sheet, or a combination thereof.

10. The method of claim 1, wherein the primary LDM is a stationary LDM.

11. The method of claim 1, wherein the primary LDM receives a compression force from said MBI.

12. The method of claim 1, wherein the primary LDM provides liquid to the reaction product path, said reaction production path being disposed between a surface of the solid fuel mixture and the MBI, wherein the reaction product path fluidly passes the reaction products away from the reaction zone.

13. The method of claim 12, wherein the reaction product path comprises at least one channel disposed on a surface of said solid fuel mixture, at least one channel disposed through said solid fuel mixture, at least one helix channel disposed about said solid fuel mixture, a contained region disposed about said solid fuel mixture, at least one conduit abutting said solid fuel mixture, or a combination thereof.

14. The method of claim 1, wherein the MBI is an elastic membrane disposed to envelope said solid fuel mixture, such that when the reactants are present in said reaction product path the elastic membrane is disposed to apply a pressure on the reactants to propagate said reactant along the reaction product path.

15. The method of claim 1, wherein the elastic membrane pressure applied to the reactants is a variable pressure.

16. The method of claim 2, further comprising a pump fluidly connected to the primary LDM.

17. The method of claim 1, wherein the reaction product(s) exiting said reaction zone comprises a combination of a partially reacted liquid fuel reactant and solid fuel mixture.

18. The method of claim 1, wherein the delivery of the primary liquid delivery medium comprising a liquid fuel reactant so as to contact a solid fuel mixture controls the rate and amount of the hydrogen gas produced.

19. The method of claim 1, said method being conducted in a reaction control mechanism comprising:
 a. the solid fuel mixture;
 b. the liquid fuel reactant contained within a reservoir;
 c. the primary liquid delivery medium (LDM) fluidly connecting the reservoir to the solid fuel mixture;
 d. the movable boundary interface (MBI) that biases a primary liquid delivery medium against the solid fuel mixture;
 e. the reaction zone defined between the solid fuel mixture and the primary liquid delivery mechanism; and
 f. the secondary LDM fluidly connecting the reservoir to the reaction product path to control an overall reaction stoichiometry, the secondary LDM being located in the reaction product path exiting the reaction zone.

20. The method of claim 1, said method being conducted in a reaction control mechanism comprising:
 the solid fuel mixture;
 the liquid fuel reactant that reacts with the solid fuel mixture to produce reaction products;
 the primary liquid delivery medium fluidly connecting the liquid fuel reactant to the solid fuel mixture;
 the movable boundary interface coupled to the primary liquid delivery medium distal the solid fuel mixture that biases the primary liquid delivery medium against the solid reagent;
 the reaction product path, defined in the solid fuel mixture, that fluidly connects the reaction zone defined between the solid fuel mixture and the primary liquid delivery medium with area external the reaction control mechanism; and
 the secondary liquid delivery medium fluidly connecting the liquid fuel reactant to the reaction product path.

\* \* \* \* \*